United States Patent
Hara (10) Patent No.: US 10,642,626 B2
(45) Date of Patent: May 5, 2020

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Kenji Hara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/903,407

(22) Filed: Feb. 23, 2018

(65) Prior Publication Data
US 2018/0253318 A1  Sep. 6, 2018

(30) Foreign Application Priority Data
Mar. 3, 2017 (JP) .................. 2017-040898

(51) Int. Cl.
G06F 1/24 (2006.01)
G06F 15/177 (2006.01)
G06F 9/4401 (2018.01)
G06F 3/12 (2006.01)

(52) U.S. Cl.
CPC .......... G06F 9/4416 (2013.01); G06F 3/1221 (2013.01); G06F 3/1229 (2013.01); G06F 3/1236 (2013.01); G06F 3/1285 (2013.01); G06F 9/4408 (2013.01); G06F 9/4418 (2013.01); Y02D 10/1592 (2018.01)

(58) Field of Classification Search
None
See application file for complete search history.

(56) References Cited

U.S. PATENT DOCUMENTS

| | | | | |
|---|---|---|---|---|
| 2006/0064571 A1* | 3/2006 | Tseng | ................. | G06F 9/441 713/1 |
| 2011/0055538 A1* | 3/2011 | Cho | ................. | G06F 9/4418 713/2 |
| 2013/0073887 A1* | 3/2013 | Miki | ................. | G06F 1/3231 713/323 |

FOREIGN PATENT DOCUMENTS

JP  2003024158 A  1/2003
JP  2003241582 A  8/2003

* cited by examiner

*Primary Examiner* — Nitin C Patel
(74) *Attorney, Agent, or Firm* — Venable LLP (57) ABSTRACT

In an information processing apparatus including a plurality of boards, it is possible to appropriately perform initialization of hardware of each board in accordance with a return factor. An information processing apparatus including a first system and a second system, the first system transmitting a boot program of the second system to the second system, and the first system: receives a return factor that causes the information processing apparatus to return from a power-saving state; and is capable of transmitting a first boot program including information indicating a first return factor and a second boot program including information indicating a second return factor to the second system, and the second system: is capable of receiving the first boot program and the second boot program; and performs first boot processing in accordance with the received first boot program and performs second boot processing in accordance with the received second boot program.

18 Claims, 6 Drawing Sheets

| 601 Boot type of CPU of main board | 602 Return factor from sleep | 603 Initialization of scanner-related chip | 604 Initialization of printer-related chip |
|---|---|---|---|
| cold boot | — | not perform | not perform — 614 |
| return from sleep mode | power-saving switch pressed down | perform | perform — 613 |
| return from sleep mode | reception of job via network | not perform | perform — 612 |
| return from sleep mode | reception of non-job via network | not perform | not perform — 611 |

FIG.6

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to a control method of an information processing apparatus made up of a plurality of boards, and particularly, to a control method at the time of resuming from a power-saving mode.

Description of the Related Art

An MFP (Multi Function Peripheral) having an image copy function, an image output function, an image read function, and so on, normally moves into a power-saving mode in the case where a user does not use the MFP. Then, the MFP having moved into the power-saving mode returns from the power-saving mode in the case where a user starts to use the MFP. At this time, the MFP returns automatically from the power-saving mode (hereinafter, also called a sleep mode) to a mode in which the MFP can be used (hereinafter, called a normal operation mode) in response to a request from a user.

In the case of receiving a print request from a general-purpose personal computer (PC) in the state of having been moved into the sleep mode, the MFP returns from the sleep mode, generates a job, and performs energization and initialization of an apparatus (printer apparatus and the like) used in accordance with the kind of job. At this time, in the case where energization and initialization of an apparatus are performed after generation of a job is completed, it takes a long time for an apparatus, which takes much time for initialization, to start printing after receiving a print request. On the other hand, in the case where energization and initialization of an apparatus are performed before a job is generated, power is consumed wastefully on a condition that no job is generated. In order to solve these contrary problems, an MFP has been proposed that performs initialization of an apparatus in accordance with a factor that cancels the power-saving mode, that is, a return factor (see Japanese Patent Laid-Open No. 2003-241582).

However, in the MFP described in Japanese Patent Laid-Open No. 2003-24158, initialization of hardware (particularly, peripheral circuits of a CPU) that is performed before initialization of an apparatus is not performed in accordance with a return factor. Some kinds of hardware continue to consume predetermined power after initialization. Consequently, in the case where the hardware for which initialization is not necessary is initialized, there is a possibility that unnecessary power is consumed. Consequently, it is desired to perform initialization of hardware also in accordance with a return factor.

However, in the large-scale MFP having a controller including a plurality of units (boards) as described in Japanese Patent Laid-Open No. 2003-241582, it has been difficult to perform initialization of hardware in accordance with a return factor in each unit. Particularly, in order to perform initialization of hardware in accordance with a return factor on the side of the sub unit (engine control unit), a mechanism for the main unit (system control unit) to notify the sub unit of a return factor prior to initialization is necessary, and therefore, it is difficult to implement this.

Consequently, an object of the present invention is to provide an information processing apparatus including a plurality of units and capable of appropriately performing initialization of each unit in accordance with a return factor.

SUMMARY OF THE INVENTION

The information processing apparatus according to the present invention is an information processing apparatus including a first system and a second system that is able to communicate with the first system, the first system transmitting a boot program of the second system to the second system, and the first system: receives a return factor that causes the information processing apparatus to return from a power-saving state; and transmits a first boot program including information indicating a first return factor and a second boot program including information indicating a second return factor to the second system, and the second system: receives the first boot program and the second boot program; and performs first boot processing in accordance with the received first boot program and performs second boot processing in accordance with the received second boot program.

Further features of the present invention will become apparent from the following description of exemplary embodiments with reference to the attached drawings.

DESCRIPTION OF THE EMBODIMENTS

In the following, embodiments for embodying the present invention are explained by using the drawings. The configurations shown in the following embodiments are merely exemplary and the present invention is not limited to the configurations shown schematically.

First Embodiment

<Configuration of Printing System>

Figure 1:
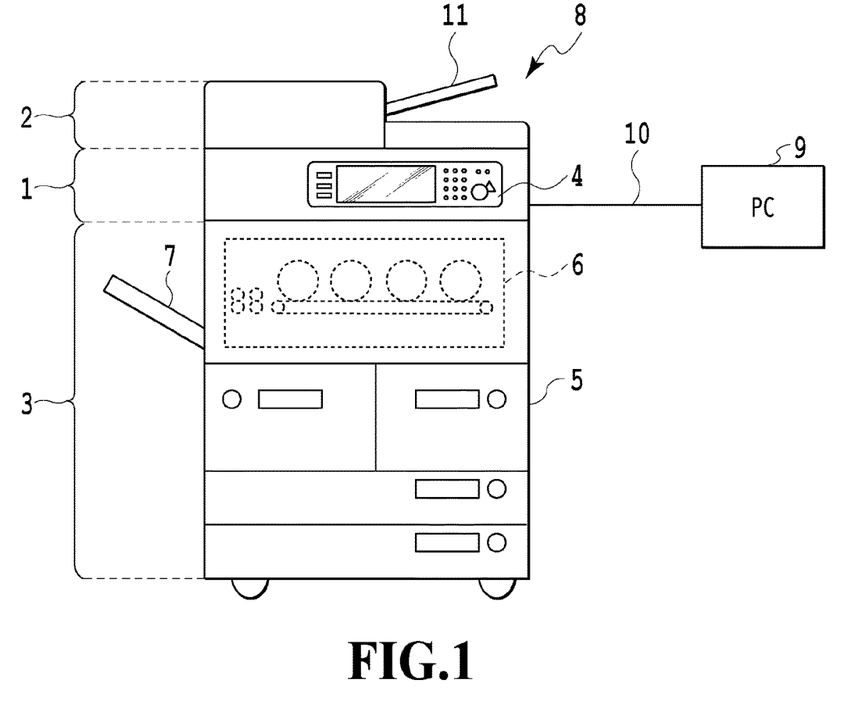
FIG. 1 is a diagram showing an example of a printing system in a first embodiment.

FIG. 1 is a diagram showing an example of a printing system in a first embodiment. As shown in FIG. 1, the printing system in the present embodiment includes an MFP 8 and a general-purpose PC 9. It is possible for the MFP 8 to communicate with the PC 9 via a network 10. The MFP 8 includes a controller (information processing apparatus) 1 that controls the entire MFP 8, a scanner apparatus 2, and a printer apparatus 3.

The controller 1 has an operation unit 4 for a user to perform operations. The operation unit 4 is, for example, a touch panel. The scanner apparatus 2 scans a document arranged on a sheet feed tray 11 or a document table (not shown schematically). The printer apparatus 3 has a sheet cassette 5, an image forming unit 6, and a sheet discharge tray 7. The image forming unit 6 performs image formation by using a photoconductor drum as an image carrier. At this time, the image formation is performed through a series of electrophotographic process, such as electrification, exposure, development, transfer, cleaning, and fixing.

For example, in the case where a user places a document on the sheet feed tray 11 of the scanner apparatus 2 and inputs copying instructions from the operation unit 4, the scanner apparatus 2 generates image data by scanning the document. The printer apparatus 3 feeds a sheet from the sheet cassette 5 and transfers a latent image corresponding to the image data generated by the scanner apparatus 3 to the sheet and fixes the latent image by using the image forming unit 6. Then, the printer apparatus 3 discharges the sheet on which the latent image is formed onto the sheet discharge tray 7. In this manner, printed matter is duplicated. The processing is controlled by the controller 1.

<Configuration of Controller>

Figure 2:
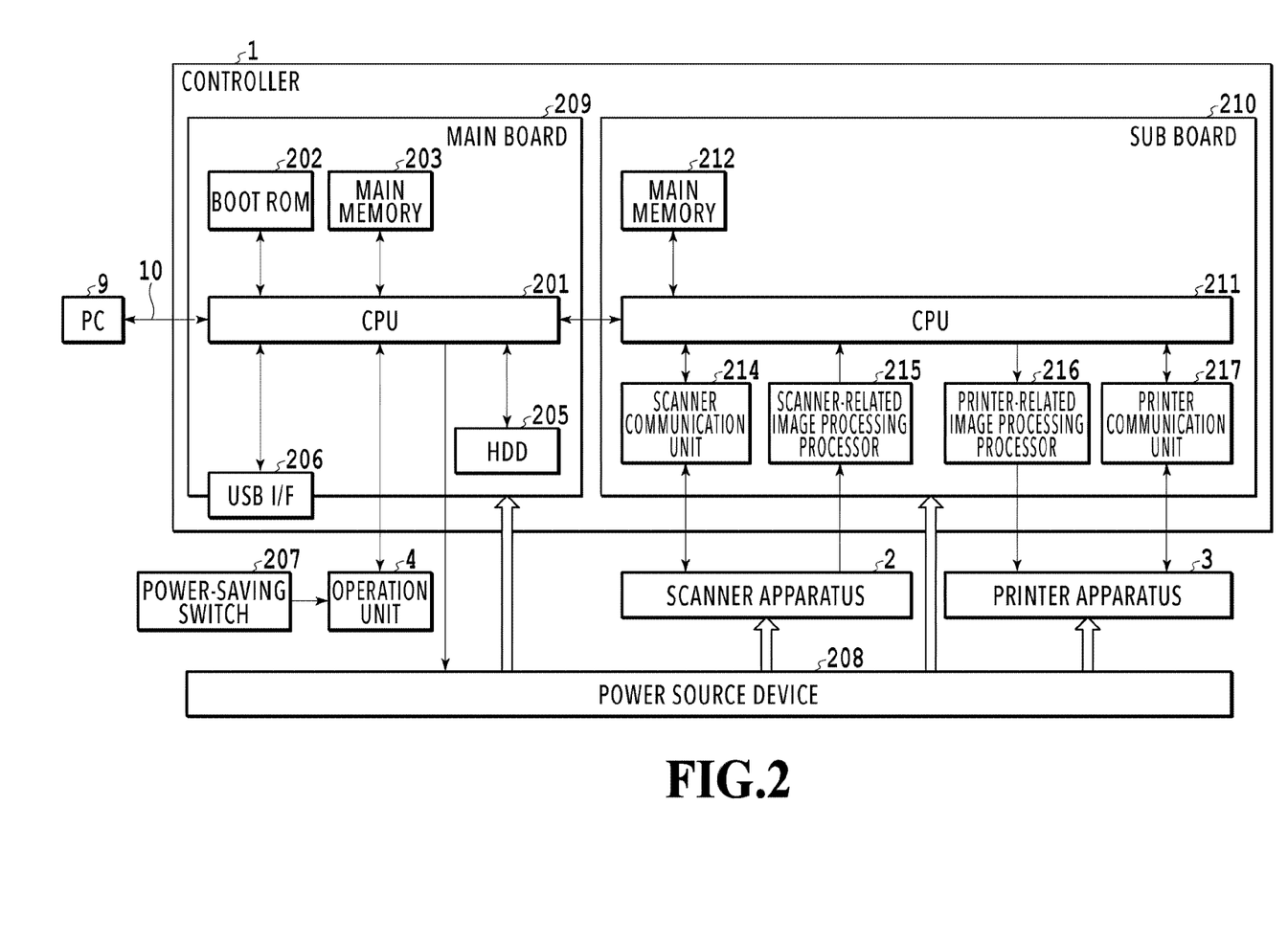
FIG. 2 is a block diagram showing an internal configuration of a controller of an MFP.

FIG. 2 is a block diagram showing an internal configuration of the controller 1 of the MFP 8. The controller 1 has a main board 209 as a main unit and a sub board 210 as a sub unit. The main board 209 and the sub board 210 are connected so as to be capable of communication. As described above, the controller 1 in the present embodiment has two boards. Normally, in order to obtain a favorable image in copying, printing, and so on, it is necessary to perform real-time image processing for image data. However, the processing load of real-time image processing is heavy and it is difficult to perform the processing by the general-purpose CPU (CPU of the main board 209) alone. Because of this, in the present embodiment, as shown in FIG. 2, the load of the CPU of the main board 209 is lightened by providing the sub board dedicated to real-time image processing.

The main board 209 performs control of making a response to a user operation through the operation unit, receiving a print request through a network, and so on. The main board 209 has a CPU 201, a boot ROM 202, a main memory 203, an HDD 205, and a USB I/F 206.

The CPU 201 controls the main board 209. In the case where the power source of the controller 1 is turned on, the CPU 201 executes a boot program stored in the boot ROM 202. Due to this, the CPU 201 boots.

The CPU 201 controls the USB I/F 206, the HDD 205, and so on, by using the main memory 203 as a work memory (temporary storage unit). Further, the CPU 201 displays an operation screen on a display panel of the operation unit 4, receives user instructions that are input via the operation screen, and so on. The operation unit 4 is provided with a power-saving switch 207 and it is possible for the CPU 201 to detect the power-saving switch 207 being pressed down via the operation unit 4. In the case of detecting the power-saving switch 207 being pressed down, the CPU 201 controls a power source device 208 to control the energization state of the main board 209, the sub board 210, the scanner apparatus 2, and the printer apparatus 3. The power source device 208 performs power supply for the main board 209, the sub board 210, the scanner apparatus 2, and the printer apparatus 3 based on instructions from the CPU 201. Solid white arrows shown in FIG. 2 represent the way the energization state of apparatuses and hardware is controlled by the power source device 208.

The sub board 210 performs control of job execution, such as copying and printing. The sub board 210 has a CPU 211, a main memory 212, a scanner communication unit 214, a scanner-related image processing processor 215, a printer-related image processing processor 216, and a printer communication unit 217. The scanner-related image processing processor 215 and the printer-related image processing processor 216 are image processing circuits that perform various kinds of image processing in accordance with contents that are set by the CPU 211.

The sub board 210 does not have an HDD. As described above, the present embodiment aims at a reduction in cost by concentrating the nonvolatile resources on the side of the main board 209. However, in this case, it is necessary to store the operation program of the CPU 211 of the sub board 210 within the boot ROM of the sub board 210. However, the unit price of capacity of the boot ROM is expensive, and therefore, the configuration in which the operation program of the CPU 211 is stored in the boot ROM is undesirable. Consequently, in the present embodiment, the operation program of the CPU 211 is stored in the HDD 205 of the main board 209. Then, after the CPU 201 boots to a certain level, the CPU 201 transfers the operation program of the CPU 211 stored in the HDD 205 to the main memory 212. Then, the CPU 201 releases the reset of the CPU 211 and causes the CPU 211 to execute the operation program transferred onto the main memory 212. As described above, the present embodiment further aims at a reduction in cost by designing a configuration in which the boot ROM whose unit price of capacity is expensive is not mounted on the sub board 210 by causing the CPU 201 of the main board 209 to perform the processing that should be originally performed by the boot ROM of the sub board 210. Details of the boot sequence of the CPU 211 will be described later by using FIG. 5.

The CPU 211 uses the main memory 212 as a work memory (temporary storage unit). The CPU 211 and the CPU 201 perform a cooperative operation by communicating with each other. The CPU 211 mainly controls the scanner apparatus 2, the printer apparatus 3, the scanner-related image processing processor 215, and the printer-related image processing processor 216. For example, the CPU 211 sends various instructions to the scanner apparatus 2 via the scanner communication unit 214. Further, for example, the CPU 211 sends various instructions to the printer apparatus 3 via the printer communication unit 217. Furthermore, for example, the CPU 211 transmits and receives image data to and from the scanner apparatus 2 and the printer apparatus 3 by controlling the scanner-related image processing processor 215 and the printer-related image processing processor 216.

<Operation of Controller>

Here, the operation of the controller 1 in the case where copying instructions are input from the operation unit 4 is explained. Upon receipt of copying instructions via the operation unit 4, the CPU 201 gives the CPU 211 scanning instructions to cause the scanner apparatus 2 to read a document and printing instructions to cause the printer apparatus 3 to output the read document.

First, the CPU 211 performs setting of image processing, such as scaling, for the scanner-related image processing processor 215 based on contents of the scanning instructions of the CPU 201. Then, the CPU 211 instructs the scanner apparatus 2 to scan a document via the scanner communication unit 214. The scanner apparatus 2 optically reads the document and converts into digital image data. It is possible for the CPU 211 to receive data of the image read by the scanner apparatus 2 via the scanner-related image processing processor 215. At this time, in the scanner-related image processing processor 215, image processing in accordance with the above-described setting is performed for the image data. The CPU 211 stores the image data for which the above-described image processing has been performed in the main memory 203.

Next, the CPU 211 performs setting of image processing, such as UCR (Under Color Removal) and gamma conversion, for the printer-related image processing processor 216 based on contents of the printing instructions of the CPU 201. Then, the printer-related image processing processor 216 reads the above-described image data stored in the main memory 203, performs image processing in accordance with the above-described setting for the read image data, and transmits the image data to the printer apparatus 3. The printer apparatus 3 forms an image (latent image) on a sheet by using the image forming unit 6 based on the image data received from the printer-related image processing processor 216 and discharges the sheet on which an image is formed.

In the case where printing of a plurality of copies is performed, it is necessary to implement an electronic sort. Because of this, the CPU 211 transmits image data received from the scanner apparatus 2 to the CPU 201 and the CPU 201 temporarily stores the image data in the HDD 205. Due to this, it is possible to implement printing of the second and subsequent copies by the CPU 201 only inputting the image data temporarily stored in the HDD 205 and printing instructions to the CPU 211, and therefore, it is no longer necessary to use the scanner apparatus 2 several times.

<Operation of MFP at the Time of Moving into Operation Mode>

The MFP 8 moves into the sleep mode in the case where a predetermined time elapses without any user operation in the normal operation mode. Further, the MFP 8 moves into the sleep mode in the case where the power-saving switch 207 arranged on the operation unit 4 is pressed down. In the case where the MFP 8 moves into the sleep mode, the backlight of the operation unit 4 turns off.

The MFP 8 monitors the network also during the sleep mode. Then, for example, in the case of receiving a print request from the PC 9 via the network 10, the MFP 8 wakes up only the controller 1. Then, the controller 1 receives print data from the PC 9 and creates image data by turning the received print data into a bitmap. After this, the printer apparatus 3 feeds a sheet from the sheet feed cassette 5, performs image formation on the fed sheet by using the image data created by the controller 1, and discharges the sheet onto the sheet discharge tray. In this manner, the printing operation is completed. After the printing operation is completed, the MFP 8 immediately moves into the sleep mode.

<Operation of CPU of Main Board at the Time of Moving into Operation Mode>

Figure 3A:
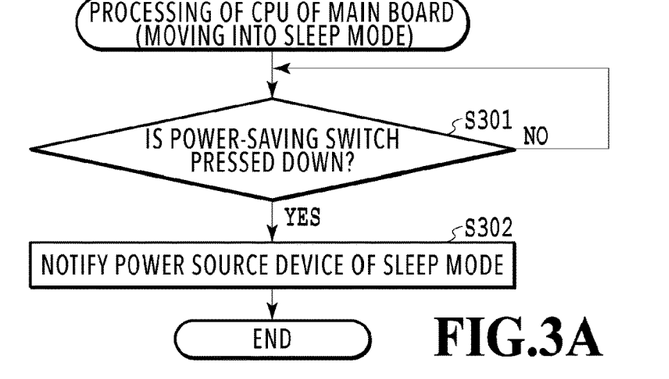
FIGS. 3A and 3B are flowcharts showing an operation of a CPU of a main board.
Figure 3B:
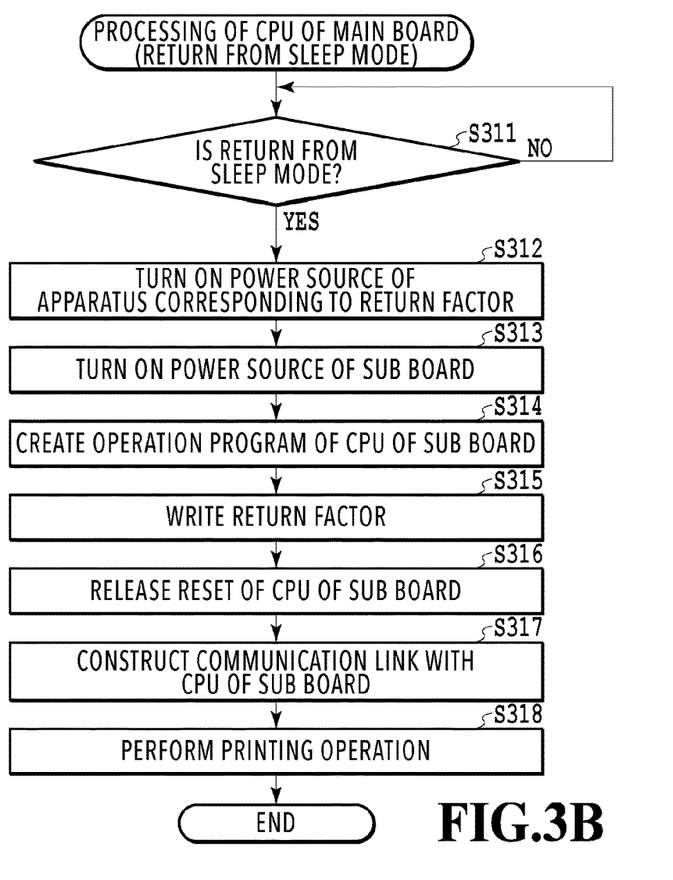

Here, the operation of the CPU 201 of the main board 209 at the time of moving into the operation mode is explained in detail. FIGS. 3A and 3B are flowcharts showing the operation of the CPU 201 of the main board 209. FIG. 3A shows the operation of the CPU 201 in the case where the power-saving switch 207 is pressed down in the normal mode. In the normal mode, the CPU 201 monitors the power-saving switch 207 periodically or intermittently (step S301). Then, in the case where the power-saving switch 207 is pressed down (YES at step S301), the CPU 201 notifies the power source device 208 that the sleep mode is set (step S302). Upon receipt of the notification of the sleep mode, the power source device 208 performs control so as to move the main board 209, the sub board 210, the scanner apparatus 2, and the printer apparatus 3 into the power-saving state. Specifically, the power source device 208 brings the sub board 210, the scanner apparatus 2, the printer apparatus 3, and the main board 209 into the power-saving state by reducing part of the power thereof. Due to this, the sleep mode is entered in which it is possible for the MFP 8 only to receive data from the PC 9 and a signal indicating that the power-saving switch 207 is pressed down.

FIG. 3B shows the operation of the CPU 201 of the main board 209 in the case of resuming from the sleep mode by a print request. In the sleep mode, the power-saving state of each apparatus continues until a factor of resuming from the sleep mode occurs (step 311). Here, the operation in the case where a print request from the PC 9 is input to the CPU 201 and the controller 1 returns from the sleep mode is explained.

In the case where a print request from the PC 9 is input in the sleep mode, the CPU 201 determines that a return factor has occurred. Then, the CPU 201 stores information indicating the return factor (hereinafter, referred to as return factor information) in the main memory 203. The return factor information includes a boot type, in addition to a return factor. The boot type includes cold boot, return from sleep mode, and so on. Here, the boot type is "return from sleep mode" and the return factor thereof is "reception of job via network". The return factor "reception of job via network" indicates that the MFP 8 has returned from the sleep mode by a print request (job) input via the network 10. The boot type and the return factor will be described in detail by using FIG. 6.

In the case where a return factor has occurred (YES at step S311), the CPU 201 instructs the power source device 208 to turn on the power source of each apparatus corresponding to the return factor (step S312). For example, in the case of receiving a print request from the PC 9, the CPU 201 determines that the printer apparatus 3 is used and instructs the power source device 208 to energize the printer apparatus 3. Due to this, the printer apparatus 3 boots.

Next, the CPU 201 instruct the power source device 208 to energize the sub board 210 (step S313). Then, the CPU 201 creates the operation program of the CPU 211 in the main memory 212 of the sub board 210 (step S314). Specifically, the CPU 201 transfers (writes) the operation program of the CPU 211, which is stored in advance in the HDD 205, from the HDD 205 to the main memory 212 by DMA transfer. In fact, the operation program stored in the HDD 205 is read onto the main memory 203 and the operation program is DMA-transferred from the main memory 203 to the main memory 212.

Figure 4:
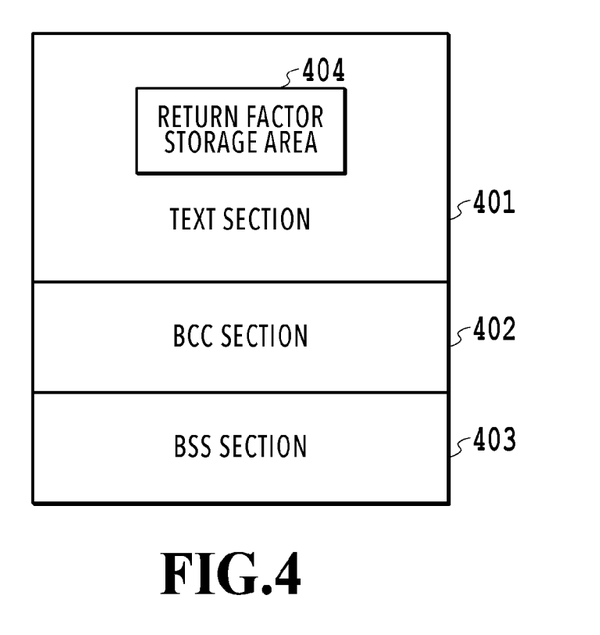
FIG. 4 is a diagram showing an example of an operation program that is transferred from the main board to a sub board.
Figure 5:
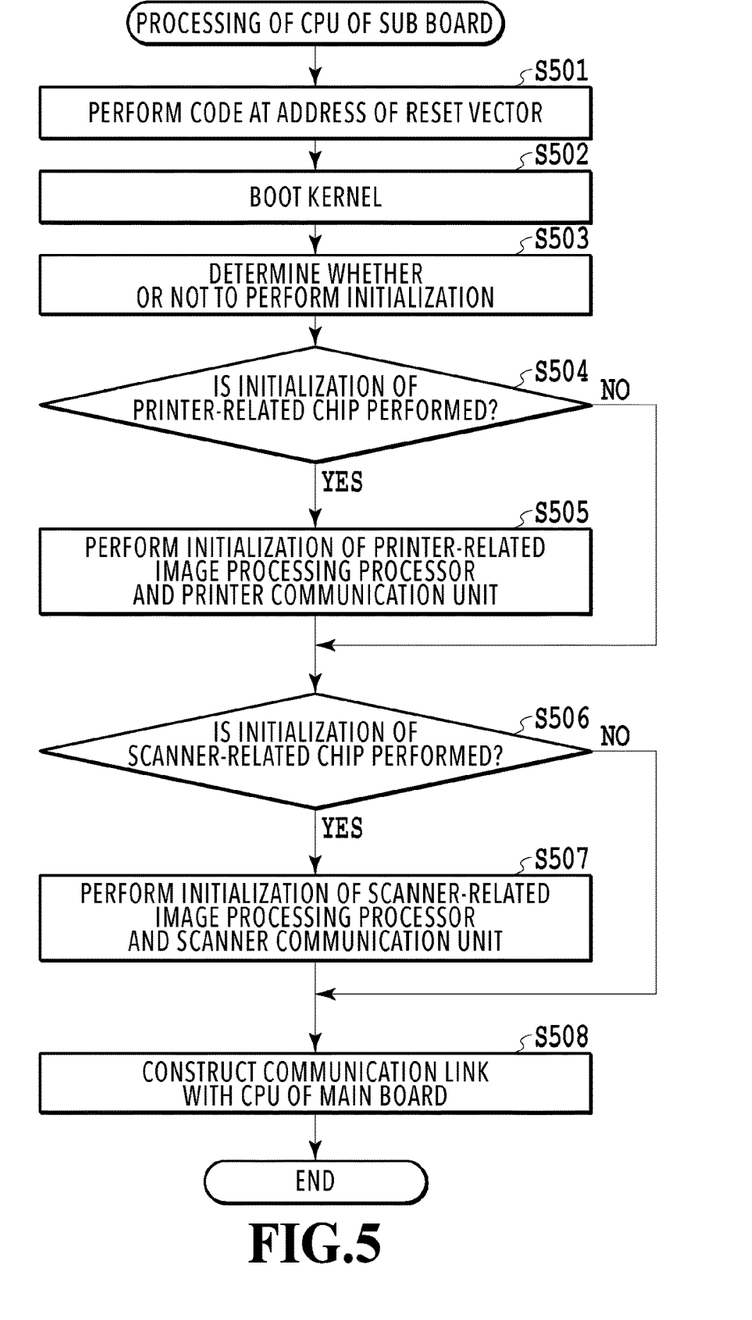
FIG. 5 is a flowchart showing a boot sequence of a CPU of the sub board.

FIG. 4 is a diagram showing an example of the operation program of the CPU 211, which is transferred from the main board 209 to the sub board 210. The operation program (binary data) shown in FIG. 4 is generated by compiling and linking the source code. In the operation program shown in FIG. 4, at least the program (boot program) to perform the boot sequence (boot processing) of the CPU 211, which is shown in FIG. 5, and the control program to control the operation after the CPU 211 boots are included. A TEXT section 401 is an area to store data generated by linking instructions for the CPU 211. The TEXT 401 has an area (return factor storage area 404) to store return factor information. A BCC section 402 is an area to store a variable having an initial value. A BSS section 403 is an area to store a variable not having an initial value.

As described above, the CPU 211 does not have the boot ROM. Consequently, in the CPU 211, a reset vector address (hereinafter, simply referred to as a reset vector) is allocated to an address on the main memory 212 to which the above-described operation program is written. Due to this, it is made possible for the CPU 211 of the sub board 210 to boot without having the boot ROM.

After step S314, the CPU 201 transfers the return factor information stored in the main memory 203 to the main memory 212 of the sub board 210 by DMA transfer (step S315). Due to this, information indicating the boot type and the return factor is written to the main memory 212. Here, as the boot type, information indicating "return from sleep mode" is written and as the return factor, information indicating "reception of job via network" is written. In the DMA transfer at step S315, a transfer destination address is set so that the return factor information is transferred to the return factor storage area 404 within the TEXT section 401 of the operation program having already been written to the main memory 212.

After step S315, the CPU 201 releases the reset of the CPU 211 (step S316). Then, the operation program stored in the main memory 212 is executed and the CPU 211 boots. By controlling the reset signal of the CPU 211, the CPU 201 gives instructions to start execution of the above-described operation program.

The CPU 201 constructs a communication link with the CPU 211 after the CPU 211 boots (step S317). Due to this, a state is brought about where the communication between the CPU 201 and the CPU 211 is possible and after this, it is made possible to for the CPU 211 to operate in accordance with the instructions of the CPU 201. Finally, the CPU 201 controls the printer-related image processing processor 216 and the printer communication unit 217 to cause the printer apparatus 3 to perform the printing operation described previously (step S318).

As described above, in the present embodiment, the CPU 201 of the main board 209 turns on the power source of an apparatus in accordance with a return factor at step S312, and therefore, it is possible to prevent an apparatus with no possibility of being used after the return from being initialized. Further, in the present embodiment, the CPU 201 of the main board 209 transfers the return factor information to the sub board 210 after transferring the operation program at step S314 and before releasing the reset of the CPU 211 of the sub board 210. Due to this, it is possible to boot the peripheral circuit of the CPU 211 of the sub board 210 in accordance with a return factor of the MFP. Consequently, according to the present embodiment, it is also possible to prevent the peripheral circuit corresponding to the apparatus from being initialized unnecessarily, in addition to the apparatus.

In the above-described flow, the transfer of the operation program (step S314) and the transfer of the return factor information (step S315) are performed separately, but it may also be possible to perform the two pieces of processing at a time. For example, it may also be possible for the CPU 201 to embed the return factor information in the return factor storage area 404 of the read operation program at the time of reading the operation program onto the main memory 203 from the HDD 205 at step S314. Then, the operation program in which the return factor information is embedded may be transferred from the main memory 203 to the main memory 212 by DMA transfer.

In the following, the operation in the case where the CPU 211 of the sub board 210 boots in accordance with each return factor is explained.

<Return from Sleep Mode by Print Request>

First, a boot sequence of the CPU 211 of the sub board 210 in the case where the CPU 201 of the main board 209 receives a print request via the network 10 is explained. FIG. 5 is a flowchart showing a boot sequence of the CPU 211 of the sub board 210. In the case where the reset of the CPU 211 is released by the CPU 201 in the processing at step S316 described above, the operation program shown in FIG. 4, which is stored in the main memory 212, is executed (step S501). Due to this, the boot sequence of the CPU 211 is started. As described above, to the reset vector, the start address of the above-described operation programs is set, and therefore, in the case where the reset of the CPU 211 is released, the above-described operation program is executed.

The CPU 211 immediately boots the kernel (step S502) and moves into the initialization phase (processing at steps S504 to S507) to perform initialization of peripheral hardware. Specifically, the initialization of hardware is initialization of hardware and driver software to control the hardware.

In the initialization phase, first, the CPU 211 performs the processing at step S503, which is characteristic processing of the present embodiment. At step S503, the CPU 211 collates the return factor information stored in the main memory 212 with an initialization table (also referred to as initialization information) shown in FIG. 6. Then, the CPU 211 determines whether or not to perform initialization of the printer-related image processing chips (the printer-related image processing processor 216 and the printer communication unit 217). Similarly, the CPU 211 determines whether or not to perform initialization of the scanner-related image processing chips (the scanner-related image processing processor 215 and the scanner communication unit 214). As described above, in the processing at step S503, based on the initialization table, hardware that is the target of initialization is determined. Hereinafter, the printer-related image processing chip and the scanner-related image processing chip are simply called a printer-related chip and a scanner-related chip, respectively.

Figure 6:
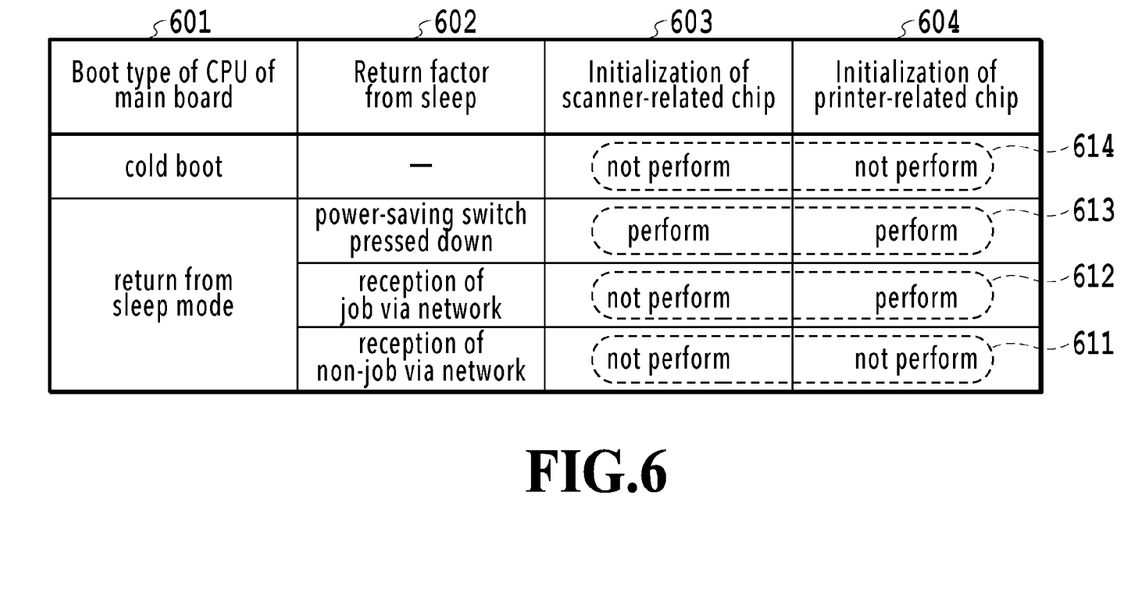
FIG. 6 is a diagram showing an example of an initialization table.

Here, the initialization table shown in FIG. 6 is explained. The initialization table is a table to determine an initialization condition from a combination of Boot type 601 and Return factor 602. For example, in the case where the CPU 201 cold-boots, the boot type is determined to be "cold boot" and an initialization condition 614 is selected. For example, in the case where the CPU 201 returns from the sleep mode, the boot type is determined to be "return from sleep mode" and one of initialization conditions 611 to 613 is selected based on the return factor thereof. For example, in the case where a print request (job) is input from the PC 9 via the network 10 and the MFP 8 returns from the sleep mode, the return factor is determined to be "reception of job via network" and the initialization condition 612 is selected. For example, in the case where a request (for example, a ping command) other than a print request is input from the PC 9 via the network 10 and the MFP 8 returns from the sleep mode, the return factor is determined to be "reception of non-job via network" and the initialization condition 611 is selected. For example, in the case where the power-saving switch 207 is pressed down and the MFP 8 returns from the sleep mode, the return factor is determined to be "power-saving switch pressed down" and the initialization condition 613 is selected. It is assumed that the initialization table shown in FIG. 6 is included in the operation program (operation program shown in FIG. 4) of the CPU 211.

Here, the boot type "return from sleep mode" and the return factor "reception of job via network" are written to the main memory 212 by the CPU 201 at step S315. Because of this, the initialization condition 612 shown in FIG. 6 is selected (step S503).

The CPU 211 determines whether to perform initialization of the printer-related chip in accordance with the initialization condition selected at step S503 (step S504). Here, the initialization condition 612 under which initialization of the printer-related chip is performed is selected (YES at step S504), and therefore, the CPU 211 performs initialization of the printer-related image processing processor 216 and the printer communication unit 217 (step S505). In the case where initialization of the printer-related chip is not performed, that is, in the case where the initialization condition 611 or 614 is selected at step S503 (NO at step S504), the CPU 211 advances to the processing at step S506.

Next, the CPU 211 determines whether to perform initialization of the scanner-related chip in accordance with the initialization condition selected at step S503 (step S506). Here, the initialization condition 612 under which initialization of the scanner-related chip is not performed is selected (NO at step S506), and therefore, the CPU 211 advances to the processing at step S508. In the case where initialization of the scanner-related chip is performed, that is, in the case where the initialization condition 613 is selected at step S503 (YES at step S506), initialization of the scanner-related image processing processor 215 and the scanner communication unit 214 is performed (step S507).

Because the initialization processing of the peripheral hardware is completed, the CPU 211 constructs a communication link with the CPU 201 (step S508). This processing is performed in synchronization with the processing at step S317 in FIG. 3B. Then, a state is brought about where the CPU 201 and the CPU 211 can communicate with each other. In this manner, the boot sequence of the CPU 211 is completed.

As described above, at the point in time at which the boot sequence of the CPU 211 is completed, a state is brought about where initialization of the printer-related hardware and the driver software is completed. Consequently, in the processing at step S318, which is performed afterward, it is made possible for the CPU 211 to immediately transfer image data to the printer apparatus 3. Further, it is so designed that initialization of the scanner-related hardware and the driver software that are not scheduled to be used at the time of return is not performed in the boot sequence of the CPU 211. As described above, in the present embodiment, the CPU 211 specifies an apparatus (printer apparatus or scanner apparatus) that is used after the return and initializes the hardware and the driver software that are used at the time of causing the specified apparatus to operate. Due to this, it is made possible to perform preparation in advance for a job request with requisite and minimum energization control. Consequently, it is possible to improve responsiveness at the time of performing a job while suppressing wasteful power consumption.

Further, in the present embodiment, the return factor storage area 404 is provided in the TEXT section 401, but it may also be possible to store return factor information in another section. For example, it may also be possible to store return factor information in the BCC section 402. Further, it may also be possible to newly provide a section to store return factor information and to store return factor information in this section.

<Return from Sleep Mode by Request Other than Print Request>

First, the boot sequence of the CPU 211 of the sub board 210 in the case where the CPU 201 of the main board 209 receives a request other than a print request via the network 10 is explained.

For example, there is a case where a user makes an inquiry about the state of the MFP 8 to the HTTP server of the MFP 8 by operating a Web browser and the like on the PC 9. At this time, an access request occurs for the HTTP server of the MFP 8. In the case where the CPU 201 detects the access request (request other than a print request) such as this via the network 10, at step S315, the boot type "return from sleep mode" and the return factor "reception of non-job via network" are written to the maim memory 212. Consequently, in the processing at step S503, the initialization condition 611 is selected. Due to this, the CPU 211 boots in the state where initialization of the printer-related chip and the scanner-related chip is not performed.

As described above, in the case where the return factor is "reception of non-job via network", the CPU 211 determines not to perform initialization of any chip of the sub board. Due to this, it is no longer necessary to perform energization control, clock supply, register initial value setting, and so on, for each chip, and therefore, it is possible to implement a large reduction in power consumption.

In the case where printing instructions or scanning instructions are input from the CPU 201 to the CPU 211 having thus booted, the processing at steps S505 and S507 is performed at this time. Consequently, according to the present embodiment, at the point in time at which printing and scanning are determined to be performed, it is possible to bring the printer apparatus 3 and the scanner apparatus 2 into an executable state. The initialization processing at steps S505 and S507 is performed after a job is received, and therefore, there is a case where the execution of a job is delayed somewhat. However, such a situation no longer occurs in which printing and scanning are not performed although the printer-related chip and the scanner-related chip are initialized, and therefore, wasteful power consumption is suppressed.

<Return from Sleep Mode by Power-Saving Switch being Pressed Down>

Next, the boot sequence of the CPU 211 of the sub board 210 in the case where the CPU 201 detects the power-saving switch 207 being pressed down in place of receiving a print request from the PC 9 is explained.

In the case of receiving an event indicating that the power-saving switch 207 is pressed down, the CPU 201 determines that a user has come to the front of the MFP 8 and taken an action to request for the return from the sleep mode. Then, the CPU 201 lights up the backlight of the operation unit 4 and at the same time, sets return factor information so that energization of both the scanner apparatus 2 and the printer apparatus 3 is started on the supposition that various operations are performed by the user. Specifically, in the processing at step S315, the CPU 201 writes the boot type "return from sleep mode" and the return factor "power-saving button pressed down" to the main memory 212. Due to this, the initialization condition 613 is selected in the processing at step S503 and the CPU 211 boots in the state where initialization of all the chips of the printer-related chips and the scanner-related chips has been performed. In this case, energization control, clock supply, register initial value setting, and so on, are performed for each chip, and therefore, there is a possibility that power consumption is increased. However, the CPU 211 returns from the sleep mode in the state where all the chips have been initialized, and therefore, it is made possible to immediately respond even in the case where a user inputs any job after the return, and therefore, it is possible to reduce the wait time of a user.

<Cold Boot>

Finally, the boot sequence of the CPU 211 of the sub board 210 in the case where the CPU 201 cold-boots by the boot program stored in the boot ROM 202 in place of the return from the sleep mode is explained. In the case where the CPU 201 cold-boots, in the processing at step S315, the boot type "cold boot" is written to the main memory 212 by the CPU 201. The boot type is not the return from the sleep mode, and therefore, information indicating a return factor is not written.

After this, in the processing at step S503, the initialization condition 614 is selected. Due to this, the CPU 211 boots in the state where initialization of all the chips of the printer-related chips and the scanner-related chips is not performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

According to the present invention, in an information processing apparatus including a plurality of units, it is possible to appropriately perform initialization of each unit in accordance with a return factor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040898, filed Mar. 3, 2017, which is hereby incorporated by reference wherein in its entirety.

What is claimed is:

1. An information processing apparatus comprising a first system and a second system that is able to communicate with the first system, the first system transmitting a boot program of the second system to the second system,
wherein the first system:
receives a return factor that causes the information processing apparatus to return from a power-saving state; and
transmits a first boot program including information indicating a first return factor and a second boot program including information indicating a second return factor to the second system, and
the second system:
receives the first boot program and the second boot program; and
performs first boot processing in accordance with the received first boot program and performs second boot processing in accordance with the received second boot program.

2. The information processing apparatus according to claim 1, wherein
the first system:
determines whether the received return factor is the first return factor or the second return factor; and
transmits the first boot program or the second boot program based on a result of the determination.

3. The information processing apparatus according to claim 2, wherein the first system has a first memory and the second system has a second memory, and the first system:
stores the first boot program or the second boot program in the first memory; and
transmits the first boot program or the second boot program stored in the first memory to the second memory of the second system by DMA(Direct Memory Access) transfer.

4. The information processing apparatus according to claim 3, wherein the second system performs the first boot processing in accordance with the first boot program stored in the second memory and performs the second boot processing in accordance with the second boot program stored in the second memory.

5. The information processing apparatus according to claim 1, wherein
the first system releases reset of the second system, and
the second system performs the first boot processing or the second boot processing when the reset is released by the first system.

6. The information processing apparatus according to claim 1, wherein
to the second system, one or a plurality of apparatuses is connected,
the second system has one or a plurality of pieces of hardware used in a case where the one or the plurality of apparatuses is caused to operate, and
the second system initializes hardware of the one or the plurality of pieces of hardware, which is used in a case where an apparatus that is used after the information processing apparatus boots is caused to operate, in each piece of boot processing of the first boot processing and the second boot processing.

7. The information processing apparatus according to claim 6, wherein
the first system transmits initialization information storing the hardware to be initialized in association with the return factor to the second system, and
the second system initializes hardware corresponding to the first return factor indicated by the initialization information in the first boot processing and initializes hardware corresponding to the second return factor indicated by the initialization information in the second boot processing.

8. The information processing apparatus according to claim 7, wherein
the initialization information includes information indicating that any of the one or the plurality of pieces of hardware is not initialized in a case where a boot type of the information processing apparatus is cold boot.

9. A control method of an information processing apparatus comprising a first system and a second system that is able to communicate with the first system, the first system transmitting a boot program of the second system to the second system, the method comprising the steps of:
by the first system, receiving a return factor that causes the information processing apparatus to return from a power-saving state;
by the first system, transmitting a first boot program including information indicating a first return factor and a second boot program including information indicating a second return factor to the second system;
by the second system, receiving the first boot program and the second boot program; and
by the second system, performing first boot processing in accordance with the received first boot program and performing second boot processing in accordance with the received second boot program.

10. A non-transitory computer readable storage medium storing a program for causing a computer to perform a control method of an information processing apparatus comprising a first system and a second system that is able to communicate with the first system the first system transmitting a boot program of the second system to the second system, the method comprising the steps of:
by the first system, receiving a return factor that causes the information processing apparatus to return from a power-saving state;
by the first system, transmitting a first boot program including information indicating a first return factor and a second boot program including information indicating a second return factor to the second system;
by the second system, receiving the first boot program and the second boot program; and
by the second system, performing first boot processing in accordance with the received first boot program and performing second boot processing in accordance with the received second boot program.

11. An information processing apparatus comprising a first system and a second system that is able to communicate with the first system, the first system having a first memory and the second system having a second memory, and the first system transmitting a boot program of the second system stored in the first memory to the second system, wherein
the first system:
obtains a return factor that causes the information processing apparatus to return from a power-saving state; and
transmits the boot program with information indicating the obtained return factor to the second system, the second system:
receives the boot program with the information indicating the return factor; and
performs boot processing in accordance with the received the boot program and the information indicating the return factor.

12. The information processing apparatus according to claim 11, wherein the second system determines a hardware initialized in the boot processing in accordance with the information indicating the return factor.

13. The information processing apparatus according to claim 12, wherein
the hardware is a scanner image processing processor or a printer image processing processor.

14. The information processing apparatus according to claim 11, wherein
the first system releases reset of the second system, and
the second system performs the first boot processing or the second boot processing when the reset is released by the first system.

15. The information processing apparatus according to claim 11, wherein
to the second system, one or a plurality of apparatuses is connected,
the second system has one or a plurality of pieces of hardware used in a case where the one or the plurality of apparatuses is caused to operate, and
the second system initializes hardware of the one or the plurality of pieces of hardware, which is used in a case where an apparatus that is used after the information processing apparatus boots is caused to operate, in each piece of boot processing of the first boot processing and the second boot processing.

16. The information processing apparatus according to claim 15, wherein
the first system transmits initialization information storing the hardware to be initialized in association with the return factor to the second system, and
the second system initializes hardware corresponding to the first return factor indicated by the initialization information in the first boot processing and initializes hardware corresponding to the second return factor indicated by the initialization information in the second boot processing.

17. The information processing apparatus according to claim 16, wherein
the initialization information includes information indicating that any of the one or the plurality of pieces of hardware is not initialized in a case where a boot type of the information processing apparatus is cold boot.

18. A control method of an information processing apparatus comprising a first system and a second system that is able to communicate with the first system, the first system having a first memory and the second system having a second memory, and the first system transmitting a boot program of the second system stored in the first memory to the second system, the method comprising the steps of:
by the first system, obtaining a return factor that causes the information processing apparatus to return from a power-saving state; and
by the first system, transmitting the boot program with information indicating the obtained return factor to the second system, by the second system, receiving the boot program with the information indicating the return factor; and
by the second system, performing boot processing in accordance with the received the boot program and the information indicating the return factor.

* * * * *